(12) United States Patent
O'Sullivan et al.

(10) Patent No.: US 9,776,323 B2
(45) Date of Patent: Oct. 3, 2017

(54) TRAINED HUMAN-INTENTION CLASSIFIER FOR SAFE AND EFFICIENT ROBOT NAVIGATION

(71) Applicant: DISNEY ENTERPRISES, INC., Burbank, CA (US)

(72) Inventors: Carol Ann O'Sullivan, Pasadena, CA (US); Chonhyon Park, Chapel Hill, NC (US); Max L. Gilbert, Glendale, CA (US); Jan Ondrej, Pasadena, CA (US); Kyle G. Freeman, Agoura, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 42 days.

(21) Appl. No.: 14/989,345

(22) Filed: Jan. 6, 2016

(65) Prior Publication Data
US 2017/0190051 A1    Jul. 6, 2017

(51) Int. Cl.
*B25J 5/00*     (2006.01)
*B25J 9/16*     (2006.01)

(52) U.S. Cl.
CPC ............ *B25J 9/1666* (2013.01); *B25J 9/163* (2013.01); *Y10S 901/01* (2013.01); *Y10S 901/46* (2013.01); *Y10S 901/49* (2013.01)

(58) Field of Classification Search
CPC combination set(s) only.
See application file for complete search history.

(56) References Cited

U.S. PATENT DOCUMENTS

| | | | |
|---|---|---|---|
| 7,966,093 B2* | 6/2011 | Zhuk | G05D 1/0088 700/245 |
| 9,174,342 B2* | 11/2015 | Pinter | G06Q 50/22 |
| 9,261,578 B2* | 2/2016 | Im | G01S 5/0252 |
| 9,358,685 B2* | 6/2016 | Meier | B25J 9/1602 |
| 9,498,886 B2* | 11/2016 | Rosenstein | B25J 5/007 |
| 2004/0140404 A1* | 7/2004 | Ohta | B64C 39/024 244/190 |

(Continued)

OTHER PUBLICATIONS

Brscic, et al, "Escaping from Children's Abuse of Social Robots," HRI '15, Mar. 2-5, 2015.

(Continued)

*Primary Examiner* — Jonathan L Sample
(74) *Attorney, Agent, or Firm* — Marsh Fischmann & Breyfogle LLP; Kent A. Lembke (57) ABSTRACT

A trained classifier to be used with a navigation algorithm for use with mobile robots to compute safe and efficient trajectories. An offline learning process is used to train a classifier for the navigation algorithm (or motion planner), and the classifier functions, after training is complete, to accurately detect intentions of humans within a space shared with the robot to block the robot from traveling along its current trajectory. At runtime, the trained classifier can be used with regression based on past trajectories of humans (or other tracked, mobile entities) to predict where the humans will move in the future and whether the humans are likely to be blockers. The planning algorithm or motion planner generates trajectories based on predictions of human behavior that allow the robot to navigate amongst crowds of people more safely and efficiently.

18 Claims, 8 Drawing Sheets

(56) References Cited

U.S. PATENT DOCUMENTS

| | | | | |
|---|---|---|---|---|
| 2004/0236470 A1* | 11/2004 | Dooley | | G05D 1/0022 700/255 |
| 2007/0016328 A1* | 1/2007 | Ziegler | | A47L 5/14 700/245 |
| 2007/0042716 A1* | 2/2007 | Goodall | | H04W 16/18 455/67.11 |
| 2007/0192910 A1* | 8/2007 | Vu | | B25J 5/007 700/245 |
| 2007/0198128 A1* | 8/2007 | Ziegler | | B25J 5/007 700/245 |
| 2009/0198380 A1* | 8/2009 | Friedman | | A47L 9/009 700/259 |
| 2010/0106356 A1* | 4/2010 | Trepagnier | | G01S 17/023 701/25 |
| 2011/0090052 A1* | 4/2011 | Warner | | H04Q 9/00 340/10.1 |
| 2011/0231016 A1* | 9/2011 | Goulding | | G06N 3/008 700/246 |
| 2011/0288684 A1* | 11/2011 | Farlow | | B25J 11/009 700/264 |
| 2012/0173018 A1* | 7/2012 | Allen | | B25J 13/06 700/245 |
| 2012/0182392 A1* | 7/2012 | Kearns | | B25J 11/009 348/46 |
| 2012/0185095 A1* | 7/2012 | Rosenstein | | B25J 5/007 700/259 |
| 2014/0200713 A1* | 7/2014 | Allen | | B25J 11/009 700/253 |
| 2015/0088310 A1* | 3/2015 | Pinter | | G06Q 50/22 700/253 |
| 2016/0188977 A1* | 6/2016 | Kearns | | G06K 9/00664 348/113 |
| 2016/0229058 A1* | 8/2016 | Pinter | | G06Q 50/22 |

OTHER PUBLICATIONS

Trautman, et al, "Robot Navigation in Dense Human Crowds: Statistical Models and Experimental Studies of Human-Robot Cooperation," The International Journal of Robotics Research, 2015, vol. 34(3) 335-356.

* cited by examiner

TRAINED HUMAN-INTENTION CLASSIFIER FOR SAFE AND EFFICIENT ROBOT NAVIGATION

BACKGROUND

1. Field of the Description

The present invention relates, in general, to methods and systems for controlling a robot (such as a service or entertainment robot) for safe and efficient navigation in spaces (or "workspaces") with one to many human (or other sentient beings), and more particularly, to a classifier or classifying software module for use by a robot controller (or for controlling a robot), when navigating a robot through a crowded workspace. The classifier is designed and adapted specifically to predict whether a human in the workspace will block (which includes a variety of interactions) the robot's travel through the workspace, or, stated differently, the classifier acts to determine intentions of all humans in a workspace or in the vicinity of the robot to facilitate tasks that require knowledge of such intentions. This could include navigation from a present location to a goal location or destination in the workspace in a manner that is responsive to predicted or future behavior of nearby humans or could include preparing for interaction with humans that show an intention to interact with the robot, e.g., for entertainment or other purposes. It could also serve as an advance warning system for a human monitor of the robot's activities.

2. Relevant Background

Today, robots are widely used in a wide variety of environments including public environments where the robots may need to interact with or at least safely navigate through or nearby to humans. Human behavior is complex, which makes it difficult to accurately predict what any particular person will do in the future. This is a primary challenge or difficulty in planning robot interactions with people and for navigating a robot through a space (or "workspace") that may include a few humans or may even be very crowded with humans.

In more traditional applications, robots are used in industrial environments in confined spaces where humans may have limited access. More recently, though, service robots have been designed and distributed that are configured to interact with humans. Therefore, safe navigation is becoming a more important challenge for such robots, and, as a result, human-aware motion planning has been an increasingly active area of research for those in the robotics industry. One goal of a designer of a motion planner for a robot is to generate robot paths (or trajectories) in the workspace that are physically and psychologically safe for the humans and also for the robot itself.

In many previous planner design approaches, a scenario is assumed in which the robot interacts with one person or only a few people. In the near future (or presently), there will be robots in public spaces such as streets or parks for service and entertainment purposes. In such "crowded" environments, robots will be required to be aware of multiple humans on an ongoing basis in order to navigate safely through the workspace (e.g., the park or street). Several prior works have modelled the more crowded situation by considering humans in the workspace to be dynamic obstacles that the robot needs to avoid (e.g., all small children will abuse the robot so as to block its travel and should be avoided). Other motion planners have instead computed joint motions among the robot and humans using the assumption that both will act in a cooperative manner (as is common in human-to-human interactions in a crowd) to avoid blocking each other's travel. These assumptions may be useful in some settings, such as for a service robot that is assisting in people's daily tasks, but these assumptions may be erroneous in other settings, such as for an entertainment-providing robot, where human behavior toward a robot can be much more difficult to predict.

In one particular example, it may be desirable to provide a robot that wanders around a public space, such as an amusement park, during an event and intentionally interacts with people in a crowd for entertainment purposes. Some of the people will almost certainly approach the robot, as opposed to moving out of its path as in the collaborative model, while others may enjoy the robot from a safe distance (e.g., not block its path or interact in any way). The people who approach the robot may block its present trajectory and may even engage in activities that are potentially harmful to the robot. For example, a recent study has shown that children will sometimes exhibit abusive behavior towards a social robot including persistently obstructing its movement away from the child.

Hence, there is a growing need for a robot controller (or a motion planner for such a controller) that allows the robot to predict blocking (including interactive) behaviors of humans early in order to allow the robot to react appropriately and perform ameliorative actions such as altering the present trajectory or travel path in a work space to avoid a blocking human or move toward such a human for intentional interaction in some cases (e.g., to interact and entertain "interested" or "curious" guests at a theme park).

In this description, interaction is defined as being with "entities" or "tracked entities" in a workspace, and it is intended that such entities would include humans and other sentient beings and could even include other robots. Also, the term "robot" is intended to be construed broadly to include any mobile device that may be navigated through a space with an onboard controller, an offboard controller, and/or with manual instructions from a human operator, and these robots may include service robots, entertainment robots, smart cars, and the like.

SUMMARY

The above problems with robot navigation through a workspace crowded with humans can be addressed with the above classifier together with a motion planner or robot navigation module (software or code executed by a processor) for use in controlling the movement of a robot. For example, the motion planner uses output from a human-intention classifier to plan future motion of the robot (e.g., retain a trajectory, modify a trajectory, or select a new trajectory through the workspace) for safe and efficient navigation. The classifier output may take the form of a score indicating a likelihood (or probability) that each human in the workspace (or within a predefined radius around a robot) will block (including interacting) the robot's travel along a path or trajectory.

In brief, the inventors have developed a navigation algorithm or motion planner that uses the human intention classifier for implementation in mobile robots that move through an environment or workspace that is shared with humans. The navigation algorithm computes safe trajectories in situations where the humans in the robot's workspace may try to block the robot's path. Particularly, an off-line learning phase is used to train a human-intention classifier that once trained can be used by a robot's motion planner to recognize when a human intends to interact with or obstruct the robot (block its current path or trajectory in the shared workspace). During robot operations or at runtime of the robot controller and its motion planner, the trained classifier is used to predict the future motions (predicted trajectories as well as intentions relative to the robot) of the humans, and the predicted intentions and trajectories are used to compute safe and, in some implementations, efficient robot trajectories through the workspace to a goal destination or new location in the workspace.

More particularly, a mobile robot is provided that is configured with a motion planner and human-intention classifier to provide safe and efficient navigation through a workspace shared with mobile entities (such as a crowd of humans). The robot includes a drive system operating to move the mobile robot in a workspace and also includes a robot controller transmitting control signals to the drive system to follow a trajectory through the workspace. Further, the robot includes a motion planner periodically (e.g., every control time step (such as 0.1 seconds)) updating the trajectory. Significantly, the robot also includes a human-intention classifier generating a prediction of a behavior for each of a set of mobile entities in the workspace. During runtime for the robot, the motion planner performs the updating of the trajectory using the behavior predictions for the set of mobile entities. Prior to runtime, the human-intention classifier is trained to perform the prediction generating in an offline process, and, in many embodiments, the behavior involves a behavior that blocks future movement of the mobile robot along the trajectory.

In some implementations, the behavior predictions include a blocking score for each of the mobile entities defining a probability that the mobile entity will block travel of the mobile robot as it tries to follow its trajectory through the workspace. Then, the updating of the trajectory may involve avoiding a subset of the mobile entities with a blocking score corresponding with blocking entities or moving toward one or more of the mobile entities with a blocking score corresponding with non-blocking entities.

The offline training process sometimes includes: (a) gathering, while a robot moves along a goal trajectory through a space shared with a plurality of humans, a set of trajectories for the humans; (b) identifying a subset of the gathered trajectories for the humans as interfering with movement of the robot along the goal trajectory; and (c) assigning a blocking score indicating each of the subset of the gathered trajectories is associated with one of the humans that blocks the mobile robot. With such a training process completed, the prediction generating can include receiving a past trajectory for one of the mobile entities in the workspace and then comparing the past trajectory with the subset of the gathered trajectories from the offline process to generate a blocking score for the one of the mobile entities associated with the past trajectory, whereby the past trajectory is used to provide the behavior prediction.

The human-intention prediction may be used to modify or update the trajectory of the robot in a variety of ways. For example, the motion planner may be adapted to compute a repulsive potential for each of the mobile entities based on the behavior prediction. Then, it may generate a predicted trajectory in the workspace for each of the mobile entities using trajectory regression. Further, the motion planner may then perform the updating of the trajectory based on the repulsive potentials and the predicted trajectories for each of the tracked mobile entities (e.g., humans or other sentient beings) in the workspace (or in a radius around the present location of the robot).

DETAILED DESCRIPTION

The following description is directed toward a motion planner with a human-intention classifier, toward robots including such a motion planner (e.g., set of executable code or a software program), and toward a method of generating the human-intention classifier. In other words, the description addresses problems associated with robot navigation in the presence of crowds of humans by taking into account the intentions of humans towards the robot (e.g., by answering the question of what are likely future actions of nearby humans with regard to the robot).

The approach described uses an off-line learning phase based on real (i.e., previously determined/measured) trajectories of a robot and humans captured in a communal or public space. The classifier is trained to detect when a person (or "tracked (or identified) entity" such as a sentient being like a human) in the workspace (or within a predefined radius about the current location of the robot) intends to interact with or obstruct (i.e., "block") the robot. At runtime, the trained classifier is used by a motion planner (or a robot controller) to predict the future motions of the humans in the workspace. Based on these predictions, the motion planner generates safe and efficient robot behaviors (e.g., efficient navigation paths or trajectories in a workspace from a current location to a goal destination or location, an inter-action behavior between the robot and an approaching human, or the like).

The following description is organized so as to first provide an overview of prior work on human-aware robot planning and navigation in crowds. Then, the planning algorithm (or motion planner) with the human-intention classifier is described followed by a discussion of how the human-intention classifier may be developed including classifier training. The description then proceeds with discussion of runtime planning and prediction. The description further includes discussion of testing of the new motion planner including the classifier's performance in different robot operation scenarios.

One goal of human-aware robot planning approaches is to compute robot trajectories that look natural and make humans feel comfortable. There has been extensive work on human-aware robot planning in the last decade including use of proxemic interpersonal distances (or "proxemics"), which define the social distances of different human interactions, with the understanding that the same distances apply between humans and robots (e.g., robots with a friendly demeanor). Some prior planning research has used learning-based approaches to improve the performance of human-aware planning, and this has involved using case-based reasoning to estimate whether a human wants to interact with a robot. Other robot research has provided socially-aware relative motion prototypes that can be learned so as to produce more realistic motion than the motions computed using proxemics.

Most of the past human-aware approaches have treated humans as stationary obstacles or have made assumptions about the future human behavior such as always cooperative with robots or always hampering the robot motion. In contrast, the navigation approach described herein uses a learning-based method to detect when humans intend to block a robot. Then, in some cases, proxemics interpersonal distances are used in combination with the predicted human intent in the computation of the robot trajectory to determine when a human may be approaching too close to a robot or its trajectory.

Predicting the motions of humans is important for the safe navigation of a robot through its workspace shared with one to many people (i.e., a crowd of people such as a group of 3 to 12 or more sentient beings within a predefined radius such as 6 to 20 feet or more about the present location of the robot). Different approaches have been proposed to improve the accuracy of the prediction using a crowd motion model, using cooperative human behaviors, and using maximum entropy learning. Additionally, a Gaussian process is a machine learning technique that some have used in the past for predicting human motions without a specific motion model.

In yet another example of human motion predictions, a safe robot path was generated by assuming that every unaccompanied child in the crowd will perform abusive behaviors towards the robot (e.g., block its path). Particularly, children were identified by height, and the probability of abuse was calculated using the following features: (i) interaction time; (ii) pedestrian density; (iii) number of children present; and (iv) the presence (or absence) of parents/adults. The planning phase selected the next destination for the robot that had the lowest probability of abuse as either the current next destination, a random location, or the current position of nearby adults (e.g., the parents of the potentially abusive children), and, hence, this planning approach acted in general to avoid all children in a crowded space. In contrast, the inventors' human-intention classifier does not assume that all children abuse a robot or that only children would obstruct the robot. The human-intention classifier uses the positions and orientations of the pedestrian trajectory of each and every tracked entity in the nearby workspace to compute the probability of abuse (e.g., blocking).

Figure 1:
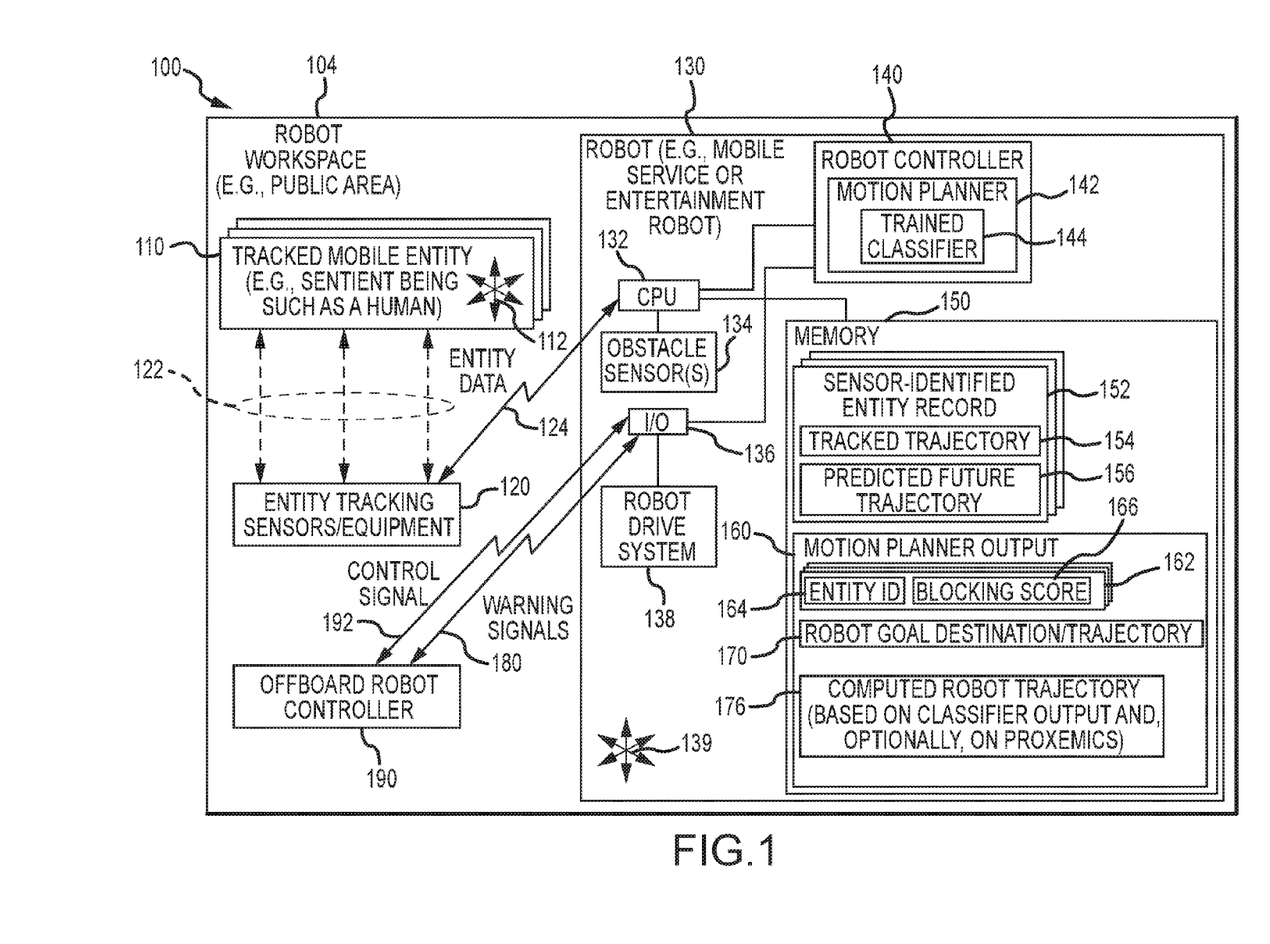
FIG. 1 is a schematic or functional block drawing of a robot control system showing use of a trained human-intention classifier to enhance robot navigation through a workspace shared with mobile entities.

FIG. 1 illustrates a robot control (or operating) system 100 making use of some of the motion planning techniques described herein. As shown, a robot workspace 104 is provided that may be a public space, such as a street or area in an amusement park served by an entertainment robot, a common area served by a service robot, and the like. The robot workspace 104 is occupied and shared by a mobile robot 130 (e.g., a service or entertainment robot, a smart car, and the like) and one-to-many (e.g., a "crowd" of) mobile entities 110 (e.g., any sentient being such as a human, another controlled robot, an animal such as a horse, a dog, or the like, and so on). The mobile entities 110 are typically free to move in any direction or follow any trajectory as shown with arrows 112, and, similarly, the robot 130 includes a drive system 138 that may be used to move the robot 130 in any direction or to follow one of a wide variety of trajectories in the space 104 as shown with arrows 139.

The system 100 includes entity tracking sensors/equipment 120 that functions to sense the presence and to track movement of each of the mobile entities 110 in the space 104 (and, typically, to collect other data such as height on each entity 110), and the tracking equipment 120 transmits collected entity data 124 to the robot 130 for processing (and/or to the offboard robot controller 190 for processing). Briefly, entities 110 such as humans sharing the robot workspace 104 can be identified, their present location and orientation determined, and their trajectory tracked by the equipment 120. This data can be stored in memory 150 of the robot 130 as shown at 152, with each record 152 typically including an entity ID along with the entity's tracked trajectory 154 (which may include the entity's current location, speed of travel, and orientation relative to the robot 130 in the space 104).

The robot 130 includes a processor(s) 132 managing/controlling operation of components on the robot 130 including an obstacle sensor(s) 134, input/output (I/O) devices 136, and memory 150. Also, the processor 132 acts to execute code or instructions (e.g., to run or execute software) to provide a robot controller 140, which provides control signals to operate the robot drive system 138 that is used to move 139 the robot in the workspace 104 such as to follow a robot trajectory 176 to reach a robot goal destination (trajectory) in the workspace 104 (e.g., to follow a particular path at a particular rate through the space 104 to move from a current location to a goal location). For example, the obstacle sensors 134 may provide data to the robot controller 140 indicating that a stationary obstacle or entity 110 has moved within the robot's predefined proxemic distance (e.g., within 1 to 3 feet or the like from the robot 130 in the robot's current travel path or trajectory 176), and the robot controller 140 may respond to avoid a collision (e.g., stop, slow down, compute a new trajectory 176, and so on) with signals sent to the drive system 138 to modify its travel in a safe manner.

The I/O devices 134 typically include wireless transceivers for communicating with the entity tracking sensors 120 to receive the entity data (or tracking data) 124 and store this information in the memory 150 as shown at 152 along with the tracked trajectory 154 for each identified entity 110 in the space 104. As explained below, this data 152 is used by the robot controller 140 to compute a robot trajectory 170 to facilitate navigation of the robot 130 through the workspace 104. In some cases, the robot controller 140 uses the I/O devices 136 to communicate warning signals 180 to the offboard robot controller 190, which may respond by providing control signals 192 to the robot 130 for use in operating the drive system 138. For example, an entity 110 may be within a predefined radius about the robot 130, and the robot controller 140 may signal 180 the controller 190, and it may process this information and send control signals 192 or a human operator may use the controller 190 to generate the signals 192 to modify operation of the drive system 138 (e.g., to stop the robot 130 at its current location in the workspace 104 or to modify the trajectory 176 to move away from the obstacle or entity 110). Additionally, as discussed below, the warning signals 180 may be generated by the robot controller 140 to indicate that the robot 130 is approaching or is nearby to an entity 110 that has been determined to likely behave in a manner that will block (including interacting with) the robot 130. The control signals 192 can then be generated to avoid this entity 110 or, in contrast, to intentionally approach and stop near this entity 110 to interact with (e.g., entertain) this entity 110 who is likely to block the robot 130.

To provide enhanced navigation in the workspace 104, the robot controller 140 is shown to include a motion planner 142 with a trained classifier 144 designed and trained according to the present description. The motion planner 142 functions to process a robot goal destination/trajectory 170 along with output 162 from the trained classifier 144 to compute or generate a robot trajectory 176, which is then implemented by the robot controller 140 via signals to the drive system 138 to move 139 the robot 130 through the workspace 104. The motion planner output 160 includes a record 162 for each of the tracked mobile entities (e.g., humans) 110 in the workspace 104 (or within a particular radius about the robot's current location in the space 104). In each record 162, an entity ID 164 is stored along with a blocking score 166.

The blocking score 166 is generated by the trained classifier 144 as discussed in detail below based on the entity's tracked trajectory 154 and the results of the education or prior training of the classifier 144. The blocking score 166 is generally a likelihood or probability (e.g., a score from 0 to 1 or a percentage or the like) that a particular entity 110 has an intent to block (e.g., interact, abuse, or otherwise interfere to a predefined amount with the travel of the robot 130 along its current trajectory 176 in the workspace 170). The blocking score 166 may change over time as the trajectory 154 for an entity 110 changes over time as determined by tracking equipment 120 and/or based on the entity's predicted future trajectory 156 as may be determined by the motion planner 142. Changes in the blocking score 166 may then result in an updated or modified robot trajectory 176 being computed periodically (e.g., the trajectory 176 may be computed every second or a shorter time period such as every 0.1 to 0.5 seconds).

With this general understanding of robot using a trained classifier to provide navigation at runtime understood, it may now be useful to describe how the trained classifier (or planning algorithm (or motion planner) with a trained classifier) is designed and generated, and this discussion will introduce notation and terminology used in the rest of the description. With regard to notations and assumptions, the robot position in a space is denoted as $q_R$ and its trajectory as $Q_R(t)$, which is a function of time t. The robot trajectory is also represented as a matrix $Q_R$, which includes discretized robot positions $q_R{}'$. The human (or tracked entity) trajectories are denoted as $Q_1(t), \ldots, Q_n(t)$, or $Q_1, \ldots, Q_n$, where n is the number of humans (or entities) in the robot workspace. The trajectory set $\{Q_R, Q_1, \ldots, Q_n\}$ is denoted as $Q_{ALL}$. The inventors assumed that the environment/workspace has sensors, with a known accuracy, that can track the position of the robot and also the positions of multiple humans/entities in the environment/workspace. It was also assumed that the robot can use the tracked information in its real time motion planning by its planner and/or trained classifier.

One goal in designing the planning algorithm is for it to function so as to provide or compute an efficient and safe robot trajectory to a given goal position while multiple humans/entities are present in the robot workspace. Some of the humans/entities are assumed to be free to approach the robot and try to block its path, which may cause the robot controller to respond by stopping the robot's travel for safety reasons when the humans get too close to the robot. Based on this assumption, the planning algorithm uses its trained classifier to detect humans, based on their past trajectories in the workspace, who have intentions to block the robot or to take other evasive actions (e.g., change directions or make a warning signal or sound). The planning algorithm then uses this identified intention of an entity/human to replan the robot path (generate a new or modified robot trajectory) or to take other evasive actions (e.g., change direction or make a warning signal or sound) such as to minimize the chances of being blocked by avoiding or otherwise responding appropriately to these humans/entities with a blocking intent.

Classification and regression are machine learning problems that involve computing the input-output mapping function y=f(x) from an empirical data set. A Gaussian process can be used for: (1) the classification of humans/entities who block the robot path and (2) the regression of future human and robot trajectories based on their past trajectories. A Gaussian process is defined as a collection of random variables, which have a joint multivariate Gaussian distribution. A Gaussian process f(x) can be specified using a mean function m(x) and a covariance function $k(x_1, x_2)$ as:

$$f(x) \sim GP(m(x), k(x_1, x_2)) \qquad \text{EQ. 1}$$

Unlike other learning techniques, the Gaussian process does not rely on a specific function model but computes a function f(x) by maximizing the smoothness of the covariance in terms of the covariance function $k(x_1, x_2)$. Therefore, the selection of the covariance function $k(x_1, x_2)$ is important for the Gaussian process, while the mean function is usually ignored and defined as a zero function without loss of generality. The details of the covariance function selections and the computation of the outputs for classification (e.g., classifier outputs) and regression are provided below.

First, however, it may be useful to provide an overview of one example of a human intention-aware planning framework. The robot planning algorithm described herein can be adapted to avoid humans who have intentions to approach the robot and to block (including interact with the robot) its path. A Gaussian process can be used to train a human intention classifier (e.g., to provide a trained classifier) in an offline mode (e.g., prior to runtime for the robot in a workspace). In order to gather the training data for the classifier, a real robot is placed in an environment or workspace with humans (or other mobile entities). In some cases, the robot to be controlled with the trained classifier (or a similarly designed robot) is used to gather the training data, and a workspace or environment is chosen that is similar to or that matches that of a space in which a robot is intended for use. For example, a service robot intended for use in a public area of a building may be placed in the space in which it is to be used and controlled using the trained classifier. In another example, a robot designed for entertainment is placed in a space where such entertaining interactions are to be provided along with a crowd or group of humans similar in makeup (ages, genders, and so on) and number as expected when the robot is controlled by the trained classifier. However, choosing a similar environment for training is not necessarily required to practice the invention.

Figure 2:
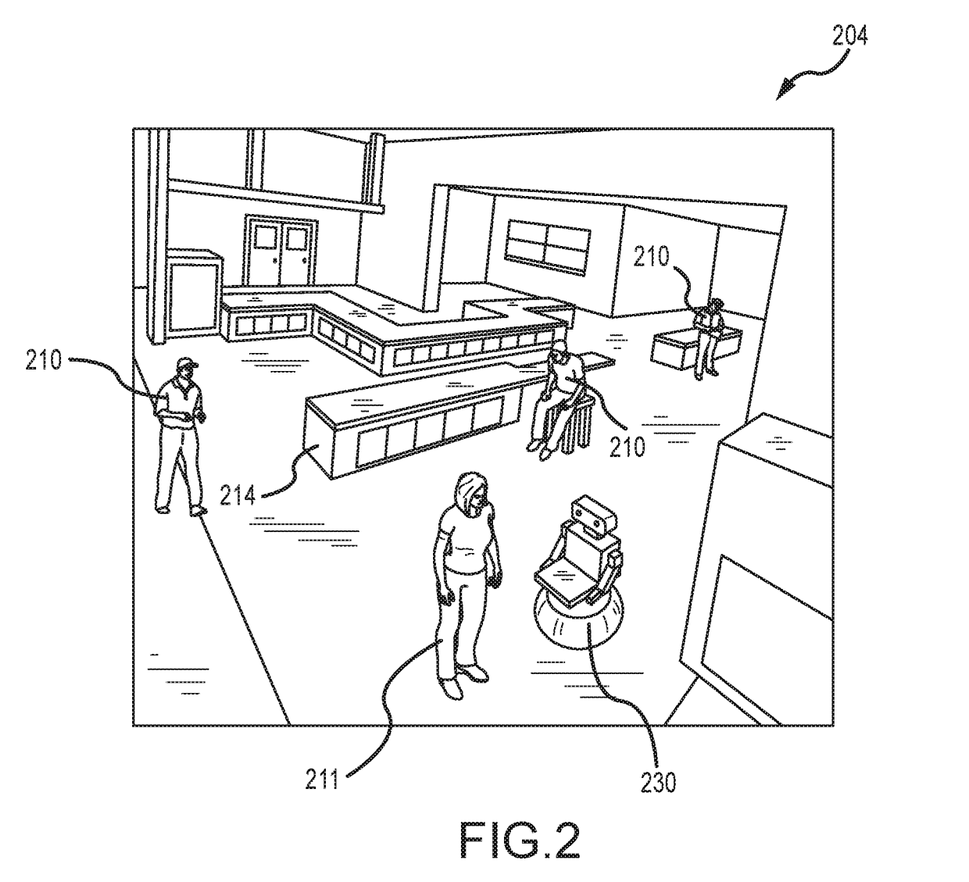
FIG. 2 is an upper perspective view of a workspace being shared by a robot and humans that can be used to gather data for training a human-intention classifier of the present description.

In one prototype example or experiment, the inventors placed an entertainment robot with a friendly demeanor in a public cafeteria and passageway of an office building. This implementation can be seen generally in FIG. 2 showing the robot 230 in a workspace 204 with stationary obstacles 214 and with a number of humans (mobile entities) 210 including one 211 that is acting to intentionally block the travel of the robot 230. As discussed with reference to FIG. 1, sensor and/or tracking equipment is provided in the workspace 204 and is used to track trajectories of the robot 230 and humans 210, 211 over a predefined time period in the workspace 204. The robot 230 used in the offline training was programmed to follow a predefined path and to stop when it detects an obstacle (human 210, 211 or otherwise 214) that blocks its travel along this predefined path.

Figure 3:
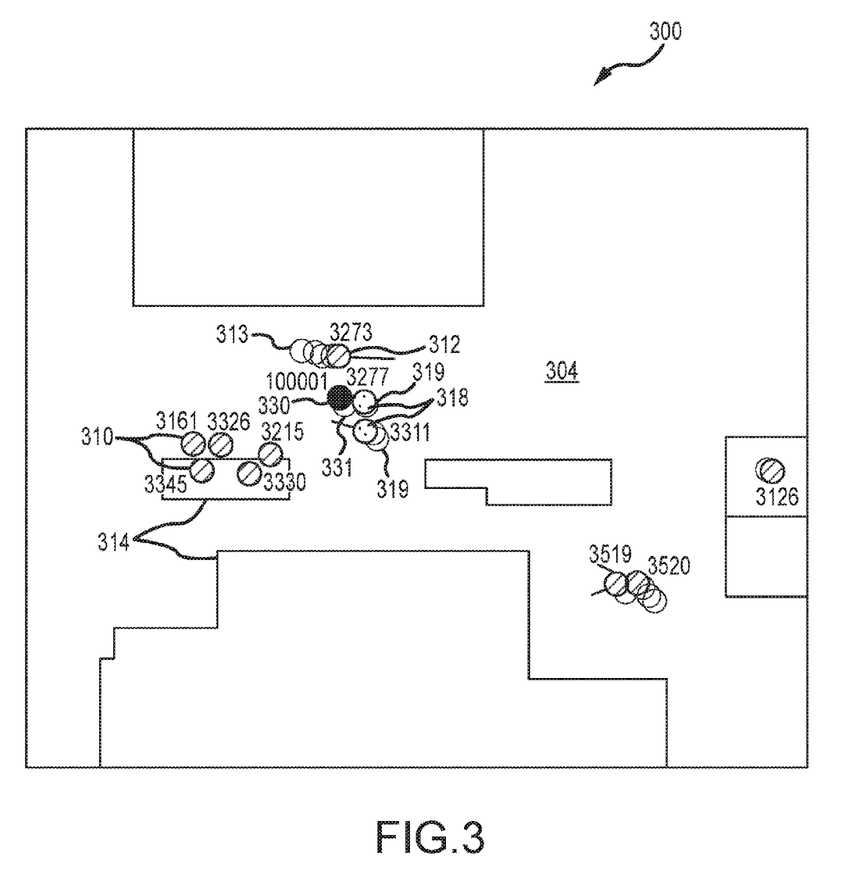
FIG. 3 is a schematic or graph showing results of a training data gather process performed by the inventors for a particular workspace, robot, and group of humans over a predefined time period.

The trajectories were recorded for the robot 230 and for the humans 210, 211. This is shown generally in FIG. 3 with the schematic 300 of a workspace 304 with mobile entities (humans, for example) 310 and stationary obstacles 314 and also with robot 330. As shown, a trajectory 313 can be recorded for each human 312 (with each human labeled with an ID number or other unique identifier) as it moves through space 304, and a trajectory 331 can also be recorded for the robot 330. During the test/experiment (or training data gathering process), the trajectories 319 of humans 318 that caused the robot 330 to stop in the workspace 304 are annotated or identified (e.g., as being useful for predicting which humans 310 in the space 304 may have the intention to block the robot 330 when their trajectories match or are similar to those that did block the robot 330 during a data gathering session). As shown, the humans 310 and 312 are non-blocking while humans 318 are blocking the robot 330. Features are extracted from the recorded trajectories in the robot-centric view, and the relative distance from the robot, the orientation difference of the relative velocity, and the absolute speed were used in one implementation as variables/features for input for training a Gaussian process classifier. For the classification of humans with blocking intentions, the blocking score (or classifier output) was set at 1.0 (e.g., 100 percent probability of blocking intention as these humans 318 did in fact block the robot 330 in the experiment) as the output value for the positive trajectory data (blocked the robot) while the output was set at 0.0 for the negative data (e.g., for the humans 310 and 313 that did not block the robot 330 in the experiment).

Figure 4:
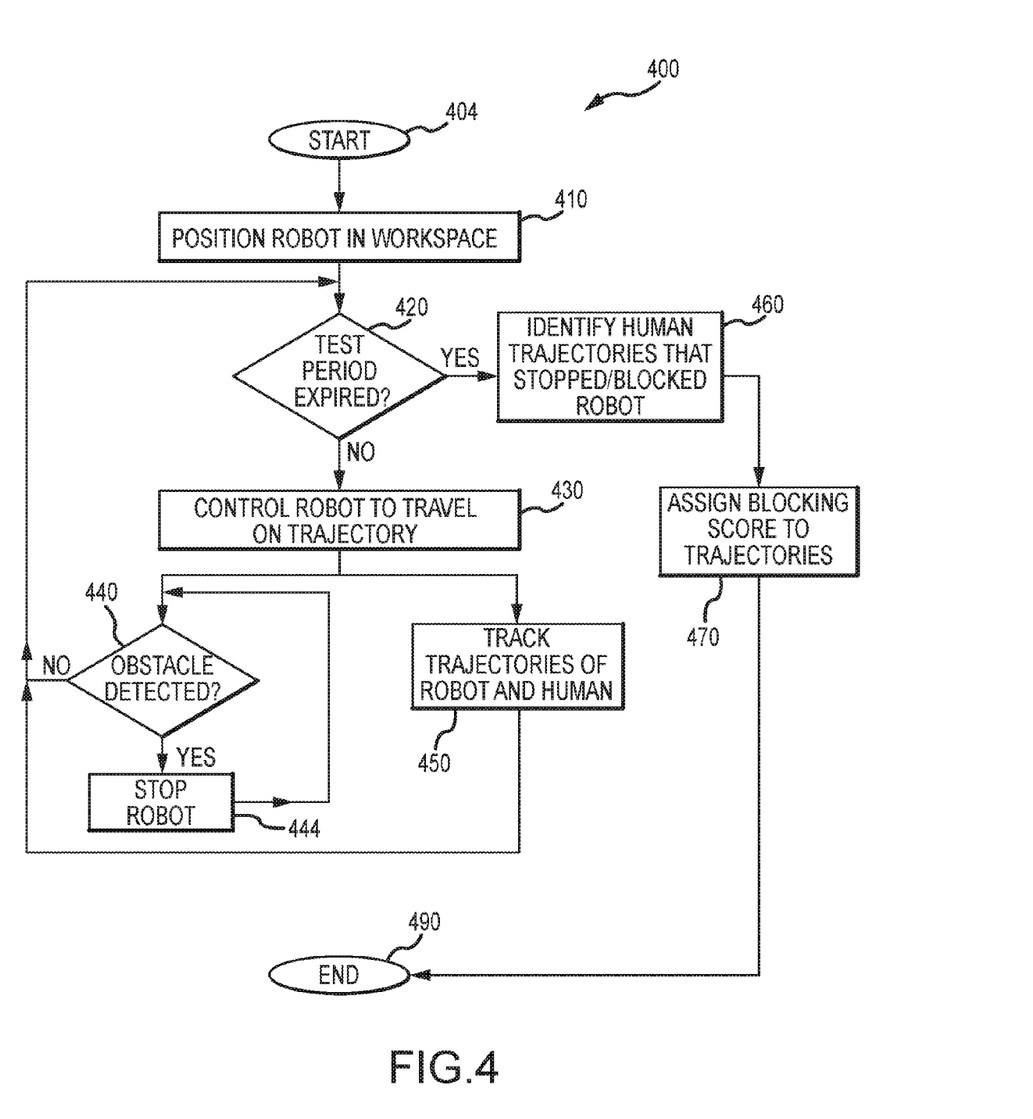
FIG. 4 is a flow diagram of an exemplary process for gathering training data for a human-intention classifier.

FIG. 4 illustrates a training data gathering process 400 for a human-intention classifier that starts at 404 such as with selection of an environment or workspace for the data gathering and selection of a robot for use in the process 400. For example, a workspace may be chosen that matches the intended use of the robot or that is useful for simulating crowd behavior in the presence of a robot. The robot preferably is of similar design (e.g., a friendly demeanor, a service robot, or the like) as the one to be controlled by the human-intention classifier as humans may interact with differently designed robots in a variety of ways, and it may be useful to train a classifier for each of these different types of robots (e.g., a service robot classifier, an entertainment robot classifier, and so on). In step 404, a trajectory for the robot through the space may also be chosen or defined, e.g., a robot may be controlled to follow one to many paths in a repeating manner through the workspace during the data gathering period. Also, the length of the data gathering may be chosen such as 30 minutes to 8 or more hours to gather data over periods of varying numbers of humans in the workspace (and the humans may vary in their makeup over this period and/or have differing intents at differing times). Typically, the more training data that is collected the better the outputs (blocking score) from a trained classifier.

The method 400 continues at 410 with positioning the robot in the workspace and providing access to the workspace to a plurality of humans (one to many (or a crowd) of humans or other sentient beings). The method 400 then proceeds at 420 with determining whether the test/experiment time period has expired. If not, the method 400 continues at 430 with controlling the robot to travel along its trajectory (at a predefined speed(s)) The method 400 continues at 440 with determining whether an obstacle is detected, and, if yes, the robot is stopped on its trajectory at 444 until the obstacle is no longer present/detected. The method 400 continues at 420 to determine if more time remains in the data gathering/test period. Concurrently, the method 400 includes at 450 using sensor/tracking equipment to track trajectories for each of the humans/entities in the workspace and also for the robot. These past trajectories are recorded in memory or a data storage device.

When the test or data gathering time period expires as determined at 420, the method 400 involves identifying (e.g., by a human operator manually determining) which trajectories resulted in the robot being blocked, which corresponds with a stopping event at step 444. These trajectories are associated with humans/entities in the workspace that were blockers and, hence, had the human intention to interact, abuse, or otherwise block the robot's travel along its current trajectory. The method 400 continues at 470 with assigning a blocking score to each of the trajectories (and/or to the robots with such trajectories). The blocking score defines a likelihood that the trajectory is associated with a blocking entity or with a non-blocking entity, and step 470 may involve assigning a 100 percent probability to each of the past trajectories that actually did result in the robot stopping at step 444 (e.g., a score of 1.0 on a 0 to 1 scale) and a 0 percent probability to each of the past trajectories that did not result in the robot stopping or being blocked (e.g., a score of 0.0 on a 0 to 1 scale). The method 400 then ends at step 490.

Figure 5:
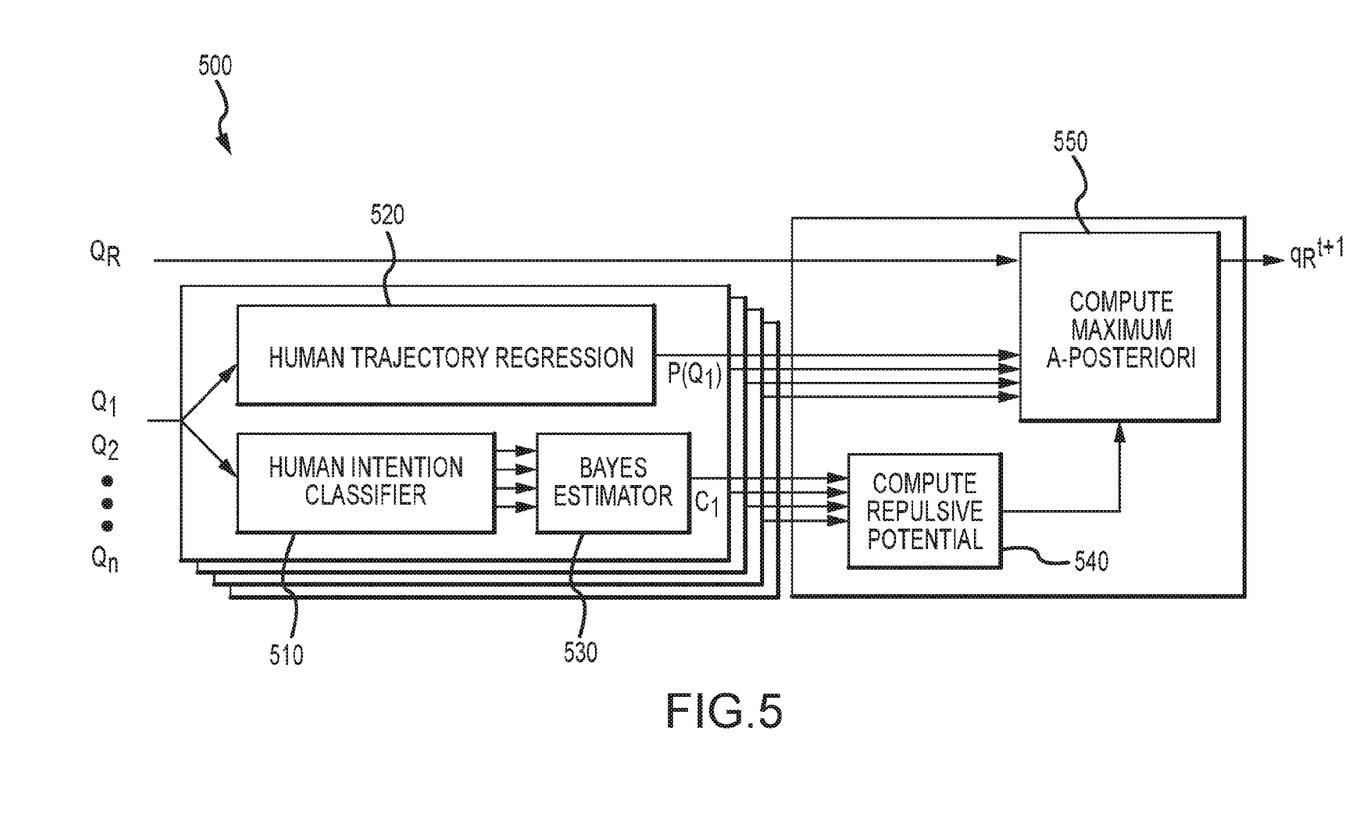
FIG. 5 is a schematic or functional block diagram of a motion planner for use in runtime planning of a robot's navigation through a space shared with mobile entities such as a crowd of humans.

FIG. 5 illustrates a motion planner 500 that may be used as a component of a robot controller to provide a framework for runtime robot planning (e.g., navigation of a robot through a space shared with humans). The motion planner 500 includes a human-intention classifier 510 as well as modules 520, 530, 540, and 550 that provide, respectively, human trajectory regression analysis, Bayes estimation, repulsive potential computation, and maximum a-posteriori computation as part of generating a trajectory for a robot in a workspace. In runtime (e.g., during operations of a robot in a workspace), the trained classifier 510 is used to compute the likelihood that a corresponding human in a workspace will interfere with or block the robot motion through the workspace (or on the present robot trajectory). The classification results are computed for each past position $q_i$ in a human trajectory $Q_i$, and then the cumulative probability $c_i$ is computed from the individual classification results from the classifier 510 using the Bayes estimator module 530.

In the planner framework 500, at a time step t, the tracked past human trajectories $Q_1 \ldots Q_n$ are used to compute the probabilistic distributions of the trajectories or $f_1(Q)$, $f_2(Q), \ldots, f_n(Q)$. The past human trajectories are also used to compute the probabilities, $c_1 \ldots c_n$, that the corresponding humans will interfere with the robot motion. The joint probability of all trajectories $f(Q_{ALL})$ is computed that includes the robot trajectory $Q_R$. The disjoint probabilistic distributions are modified by a repulsive potential from module 540 to reduce the probability when the robot and a human come close (e.g., within a predefined radius about the robot's current location in the workspace). Then, the robot position of the next time step $q_R^{t+1}$ is computed by the module 550 from the robot trajectory $Q_R^*$, which maximizes the probability of $f(Q_{ALL})$.

Stated differently, in order to navigate in a populated environment, the robot trajectory is replanned (or modified or a new trajectory is generated/chosen) to, for example, avoid the blocking humans (i.e., humans identified by the trained classifier 510 as having a high likelihood of intent to block (e.g., a blocking score of 0.7, 0.8, 0.9 or higher on the 0 to 1 scale discussed above) at each time step. The position trajectories of the humans $Q_1, Q_2, \ldots, Q_n$ are tracked with the robot trajectory $Q_R$. At each time step t, the Gaussian progress regression of module 520 is used to compute the probabilistic distribution of each individual human trajectory $p(Q_i)$. This regression is solely computed from the past trajectory and does not directly integrate the human intentions for the robot interactions. Therefore, $p_{HI}(Q_{ALL})$, which is a joint probabilistic distribution of all trajectories, is computed using the classification results of human trajectories from the human-intention classifier 510. Specifically, $p_{HI}(Q_{ALL})$ is computed as:

$$p_{HI}(Q_{ALL}) = \phi(Q_{ALL}, c_1, c_2, \ldots, c_n) \Pi_{i=R}^n p(Q_i) \quad \text{EQ. 2}$$

where $\phi(Q_{ALL}, c_1, c_2, \ldots, c_n)$ is a repulsive potential function. $\phi(Q_{ALL}, c_1, c_2, \ldots, c_n)$ lowers the probability of the distributions as the distance between the robot and a human comes close or $c_i$ has a higher value. Therefore, a high blocking likelihood $c_i$ of the i-th human causes the robot to be controlled by the motion planner to avoid the corresponding human with more space than with other humans (the likely non-blocking humans in the workspace). The robot trajectory $Q_R^*$ is computed that maximizes the probability of $p_{HI}(Q_{ALL})$, and the robot's position at the next time step $q_R^{t+1}$ is computed by the module 550 from $Q_R^*$.

At this point in the description, it may be useful to further describe how the classifier learns human intentions from recorded motions (e.g., the recorded/tracked past trajectories of humans nearby to a robot). To this end, details of an exemplary offline training process are described to provide human intention detection. As an initial or early step in the training process, training data is recorded. In one prototype implementation, the training data was collected from a communal kitchen area within a work environment (e.g., see the space 204 in FIG. 2). Employees (humans sharing the space with a robot) visited the kitchen to use the facilities and to converse and interact with each other, and employees also simply walked through the area without stopping.

In order to collect the empirical data for the human-intention classifier, the inventors ran experiments with a real robot moving through the kitchen area. The robot used in the experiments was a custom wheeled robot with a friendly demeanor and that had been developed specifically to participate in entertainment performances (e.g., the robot was an entertainment robot rather than a service robot). The robot was programmed to repeatedly follow a predefined path when unobstructed and to change its path or to stop completely in order to avoid any human in its path within a range of 0.3 meters. The robot had a LIDAR sensor attached to the front of its body and performed simple collision avoidance by first stopping its movement when a blocking obstacle was detected nearby. Then, the robot detoured from the prior path to a next waypoint on its predefined path/trajectory. As an additional safety measure, an operator who had a remote emergency stop controller oversaw the robot during the experiment.

For execution of the experiment, four LIDAR sensors (e.g., LIDAR sensors distributed by Velodyne, Inc. or the like) were installed on the walls on both sides of the space, and these sensors were used to record the X-Y trajectories of the robot and the humans in the space (e.g., movement of a point at or near the center of the humans' heads and a center point of the robot). Two separate sessions were recorded for a total data gathering time of 2.5 hours of trajectories of the robot and humans. The number of people in the kitchen area ranged from 1 to 20 over this time period. One of the test performers then acted to annotate the humans who approached the robot and caused it to stop as positive samples of trajectories associated with a human with an intent to block the robot's travel and all other humans were annotated as negative samples.

With regards to human intention classification, the inventors assumed that the intention of blocking the robot can be detected from the past trajectory of humans before the actual blocking happens in a space. With this assumption in mind, the inventors then used a Gaussian process to generate a classifier for such blocking intentions. From the recorded trajectories, the following information is extracted at each time step: (1) absolute positions, velocities (which can be decomposed into orientations and speeds), and accelerations for the humans and the robot; and (2) relative positions, velocities, and accelerations in the robot-centric view (i.e., the differences in position, velocity, and acceleration between the robot and the given human). Among the multiple candidate input features, the inventors chose the relative positions, the relative (velocity) orientations, and the absolute speeds that maximized the accuracy of the trained classifier.

Figure 6:
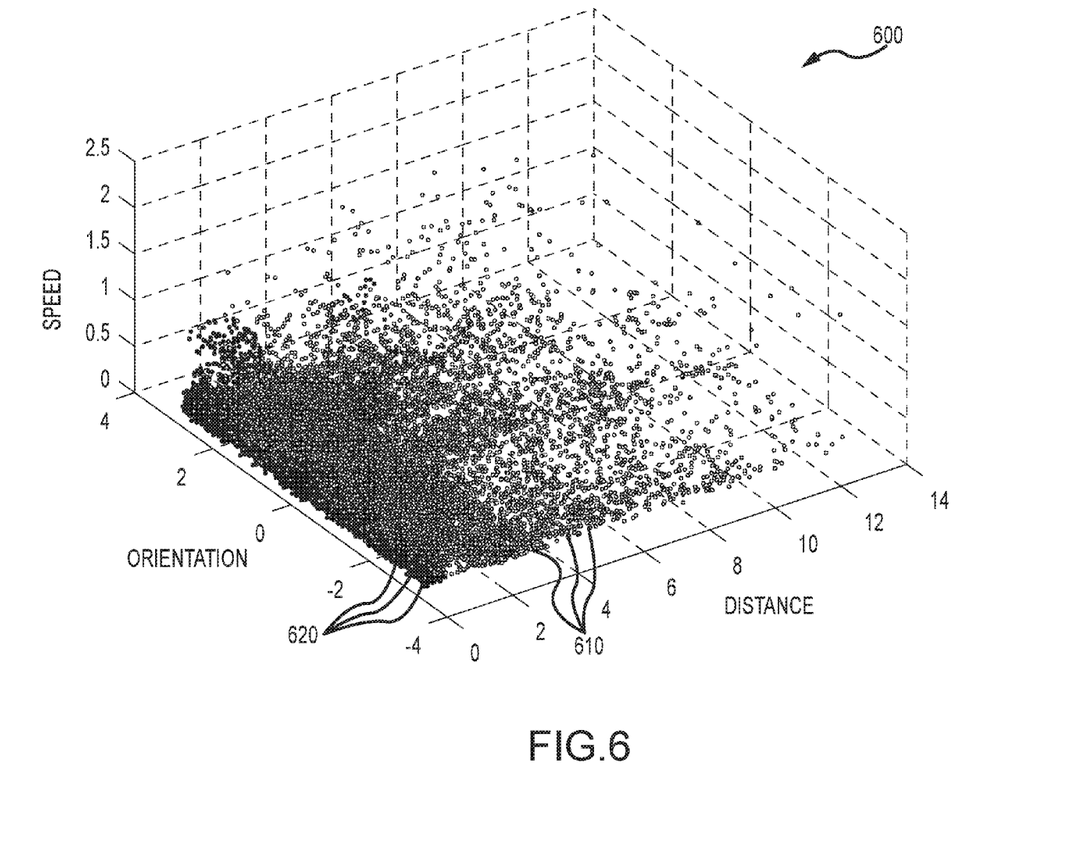
FIGS. 6 and 7 illustrate, respectively input feature data and a plot of a trained human-intention classifier.
Figure 7:
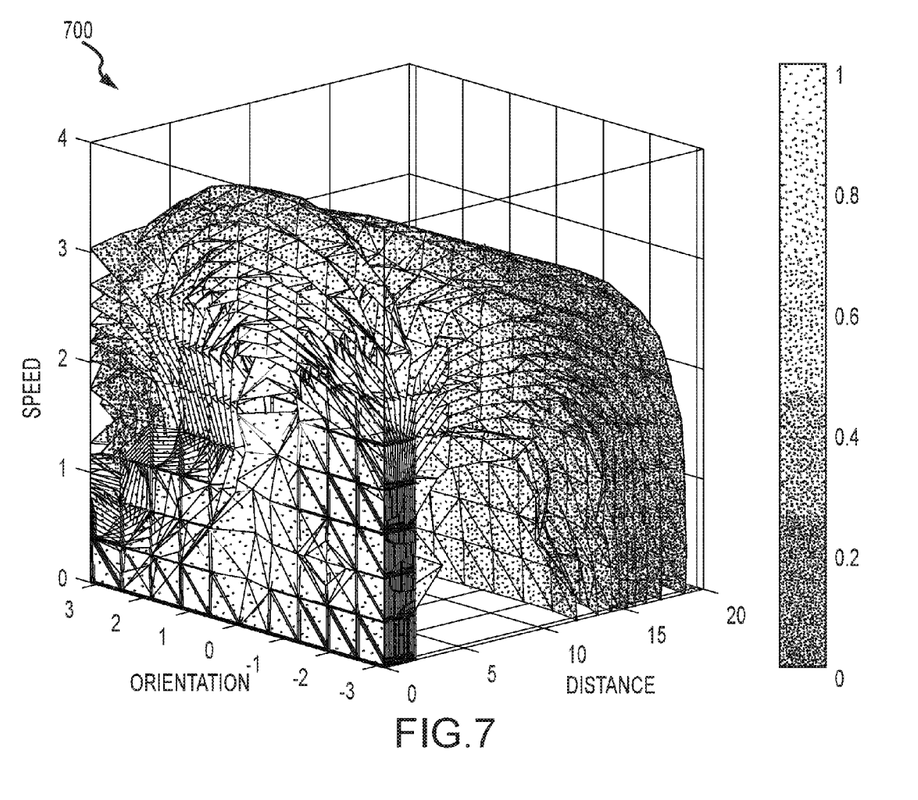

FIGS. 6 and 7 illustrate, respectively, input feature data in graph 600 and a plot 700 of a trained human-intention classifier. In graph 600, the input data of the human-intention classifier are plotted, including relative positions, relative orientation, and absolute speeds. Dots 610 represent positive relative distances, and dots 620 represent some negative relative orientations. In plot 700 of the classifier trained with the input data of graph 600, 0.0 represents no blocking intentions and higher values indicate a higher probability of blocking intentions associated with a human with a particular past trajectory in a space.

As discussed above, the Gaussian process is mainly computed using the covariance function $k(x_1, x_2)$. There are commonly used covariance functions that are solely used or combined to capture the different characteristics of the input (e.g., linear or nonlinear) such that these are not described in detail here as they will be known to those skilled in the art. The classifier training computes the optimal parameters of those functions that best fit to the input data.

For the classification of human blocking intentions, the inventors chose the sum of the squared exponential and the noise kernel as the following covariance function:

$$k(x_1, x_2) = \sigma_f^2 \exp\left(-\frac{(x_1 - x_2)^2}{2l^2}\right) + \sigma_n^2 \delta(x_1, x_2) \quad \text{EQ. 3}$$

where l, $\sigma_f^2$ and $\sigma_n^2$ are hyperparameters that are optimized, and $\delta(x_1, x_2)$ is a Kronecker delta function that is 1 for $x_1 = x_2$ and is 0 otherwise.

With training input features $X = [x_1, x_2, \ldots, x_m]^T$ and the corresponding output $y = [y_1, y_2, \ldots, y_m]^T$, the Gaussian process predicts the output $y_*$ of $x_*$ as:

$$p(y_*|y) \sim N(K_* K^{-1} y, K_{**} - K_* K^{-1} K_*^T) \quad \text{EQ. 4}$$

where K, K$_*$, and K$_{**}$ are defined as:

$$K = \begin{bmatrix} k(x_1, x_1) & k(x_1, x_2) & \ldots & k(x_1, x_m) \\ k(x_2, x_1) & k(x_2, x_2) & \ldots & k(x_2, x_m) \\ \vdots & \vdots & \ddots & \vdots \\ k(x_m, x_1) & k(x_m, x_2) & \ldots & k(x_m, x_m) \end{bmatrix},$$ EQ. 5

$$K_* = [\, k(x_*, x_1) \quad k(x_*, x_2) \quad \ldots \quad k(x_*, x_m) \,],$$

$$K_{**} = k(x_*, x_*).$$

With the trained human-intention classifier understood, it may be useful to turn again to human motion prediction and robot navigation. The following paragraphs present the details of a runtime robot planning algorithm (e.g., a motion planner with a trained human-intention classifier), which combines trajectory regression with the classification of human intentions. As described above with reference to the motion planner 500 of FIG. 5, embodiments of the robot navigation algorithm may combine individual trajectory regression with human-intention classification to predict the trajectories using a joint probabilistic distribution.

For each tracked human trajectory $Q_i$, an online Gaussian process regression can be used in the motion planner to compute the probabilistic distribution of the trajectory $p(Q_i)$. At a time step t, the positions of the last $k_1$ time steps can be used as the input of the regression to compute the probabilistic distribution of the positions $k_1$ past and $k_2$ future time steps. The regression is then computed as:

$$p(Q_i) = p(Y_* | Y) \sim N(K_* K^{-1} Y, K_{**} - K_* K^{-1} K_*^T)$$ EQ. 6 where the regression inputs are:

$$X = [t-k_1+1, t-k_1+2, \ldots, t]^T, \quad Y = [q_i^{t-k_1+1}, q_i^{t-k_1+2}, \ldots, q_i^t]^T.$$

Also, K, K$_*$, K$_{**}$ are redefined to appropriate forms by replacing the scalar $x_*$ with a vector $[t+1, t+2, \ldots, t+k_2]$ to compute $Y^* = [q_i^{t+1}, q_i^{t+2}, \ldots, q_i^{t+k_2}]$.

The covariance function provided in Eq. 3 that is used for the human intention classification may not be adequate for the dynamic motion behaviors. In such cases, a linear covariance function with a non-linear Matern covariance function may be used to capture both linear and non-linear motion behaviors, along with the noise covariance function for the sensor noise. The covariance function used in the trajectory regression can be defined as:

$$k(x_1, x_2) = \frac{x_1 \cdot x_2 + 1}{\sigma_v^2} + \left(1 + \frac{\sqrt{3}(x_1 - x_2)}{l}\right)\exp\left(-\frac{\sqrt{3}(x_1 - x_2)}{l}\right) + \sigma_n^2 \delta(x_1, x_2)$$ EQ. 7

The hyperparameters $\sigma_v^2$, l, $\sigma_n^2$ and a are optimized with the recorded trajectories used in the offline classifier training.

The regression of the robot trajectory is computed in the same manner as in the case of the human trajectory. The only difference is that the robot has a known goal position. This position goal $q_R^{goal}$ and the approximated arrival time $t^{goal}$ are added to the regression inputs Y and X to incorporate them in the prediction to guide the future robot trajectory to the goal.

In runtime human intention classification, the trained human-intention classifier computes the probability of blocking intentions from a single past position. From $k_1$ past positions in a human trajectory Qi, the classifier computes $k_1$ probability values $[c^{t-k_1+1}, c^{t-k_1+2}, \ldots, c^t]$. Two criteria are considered for computing the cumulative blocking probability $c_i$ of the trajectory Qi from $[c^{t-k_1+1}, c^{t-k_1+2}, \ldots, c^t]$: (1) handling sudden appearances of humans and (2) giving higher weights for the latest time steps. For example, a human can suddenly appear in a position close to the robot due to many reasons (e.g., sensing error, obstacle occlusion, and the like). When the past trajectory does not have enough data, the errors from the sensing noise and the classification model affect the results more.

Further, some embodiments use the classification results of multiple positions to improve the prediction accuracy from the classification errors. However, the humans in the robot's workspace can change their blocking intentions during their motion over their trajectory. Therefore, it is desirable in some cases to assign higher (or greater) weights to the latest classification results than to the older position results. With these criteria in mind, the blocking probability $c_i$ of the trajectory $Q_i$ is computed by:

$$c_i = \frac{\sum_{j=0}^{k_1-1} a^j \cdot c_i^{t-j} + 0.5 * m}{\sum_{j=0}^{k_1-1} a^j + m}$$ EQ. 8 where a is a weight attenuation ratio (a<1) and m is the weight given to the default estimate (0.5).

A later or even final step performed by the motion planner or as part of runtime robot planning is to compute the joint probabilistic distribution of the trajectories $p_{HI}(Q_{ALL})$ from the individual probabilistic distributions $p(Q_R), p(Q_1), \ldots, p(Q_n)$ and the blocking probabilities $c_1, \ldots, c_n$. The approach used may be similar to a known process labeled "Interaction GP" in that a repulsive potential is applied to lower the probabilities when the distances between the robot and humans are close (e.g., less than predefined proxemics). However, while implementations of Interaction GP may assume that the humans always exhibit cooperative behavior toward the robot, the inventors' approach does not require such assumptions and uses the computed blocking likelihood of humans $c_1, \ldots, c_n$ to vary the repulsive potential of each human sharing a space with the robot. This approach allows efficient navigation in situations where some humans do not behave cooperatively toward the robot.

Figure 8:
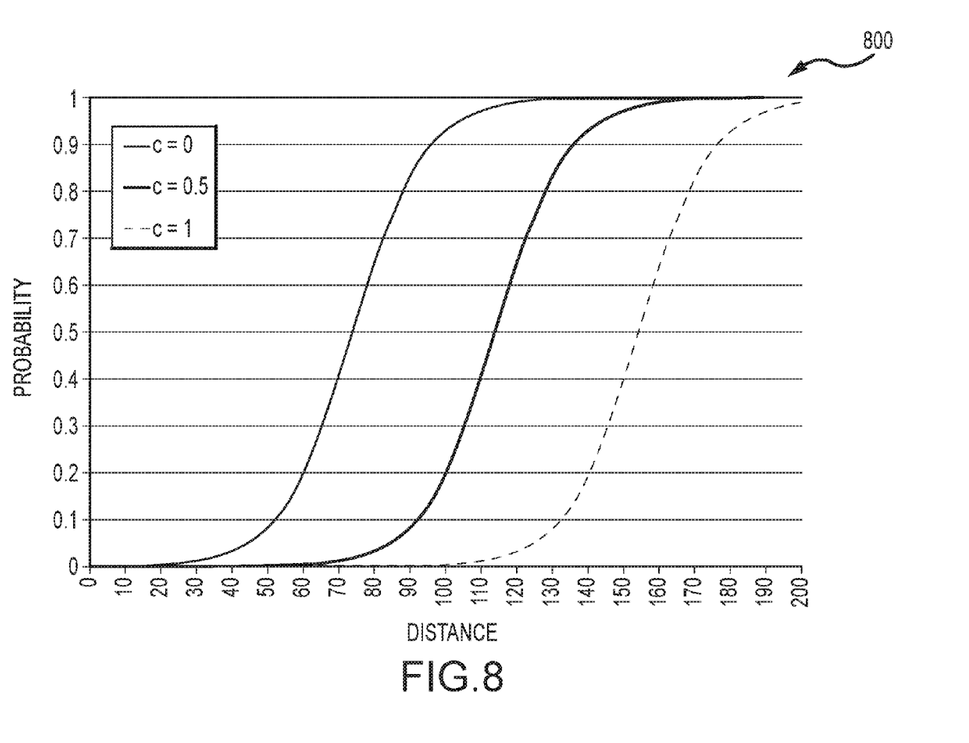
FIG. 8 is a graph illustrating the intention-aware repulsive potential curves.

In some motion planner implementations, the human intention-aware joint probabilistic distribution of the trajectories $p_{HI}(Q_{ALL})$ is computed using Equation 2. The repulsive potential $\phi(Q_{ALL}, c_1, c_2, \ldots, c_n)$ is computed as:

$$\phi(Q_{ALL}, c_1, c_2, \ldots, c_n) = \prod_{i=1}^{n} \prod_{j=t+1}^{t+k_2} \phi(q_R^j, q_i^j, c_i)$$ EQ. 9

$$\phi(q, q', c) = \frac{1}{1 + w \cdot e^{-\frac{(q-q')-s_0-s_1 \cdot c}{h}}}$$ EQ. 10 where w and h are constants that determine the stiffness of the curve, and $s_0$ and $s_1$ determine the transition along the distance between robot and humans; $\phi(q, q', c)$ is a sigmoid function translated along the distance between q and q'. The inventors set $s_0$ and $s_1$ to reduce the probabilities of trajectories where the distance between the robot is less than the personal space (d<=120 cm) when c is close to 1.0, while the robot is allowed to navigate the personal space (45 cm<d<120 cm) for small c values. FIG. 8 provides a graph 800 that presents the intention-aware repulsive potential curves $\phi(q, q', c)$ for c=0, 0.5, and 1 with w=0.01, h=10, and $s_0$=120, and $s_1$=80.

The joint probability distribution $p_{HI}(Q_{ALL})$ is usually a non-Gaussian multi-modal distribution. A stochastic approximation may be used to compute the distribution. The k-th sample trajectory of trajectory $Q_i$ is generated as:

$$Q_{ik} = \mathbb{E}(Q_i) + L \cdot N(0, I) \quad \text{EQ. 11}$$

where $\mathbb{E}(Q_i)$ is the mean of $Q_i$, L is a matrix computed from $LL^T = K$ using Cholesky decomposition of the covariance matrix K, and N(0, I) is a random sample from a Gaussian distribution with zero mean and the identity covariance matrix. The set of k-th trajectory samples can be denoted as $Q_{ALL_k} = \{Q_{Rk}, Q_{1k}, \ldots, Q_{nk}\}$. According to the importance sampling, the weight $w_k$ of $Q_{ALL}$ is:

$$w_k = \frac{p_{HI}(Q_{ik})}{p(Q_{ALL_k})} \quad \text{EQ. 12}$$

$$= \frac{\phi(Q_{ALL_k}, c_1, c_2, \ldots, c_n) \prod_{i=R}^{n} p(Q_i k)}{\prod_{i=R}^{n} p(Q_i k)}$$

$$= \phi(Q_{ALL_k}, c_1, c_2, \ldots, c_n)$$

The probabilistic distribution $p_{HI}(Q_{ALL})$ is approximated using the empirical sampling distribution:

$$p_{HI}(Q_{ALL}) \approx \frac{\sum_k w_k \delta(Q_{ALL_k} - Q_{ALL})}{\sum_k w_k} \quad \text{EQ. 13}$$

where $\delta( )$ is Dirac delta function. Then, from the approximated $p_{HI}(Q_{ALL})$, the maximum a posteriori probability (MAP) is computed as:

$$Q_{ALL}^* = \underset{Q_{ALL}}{\operatorname{argmax}} \, p_{HI}(Q_{ALL}) \quad \text{EQ. 14}$$

The robot position at the next time step $q_R^{t+1}$ can be extracted from $Q_R^*$ in $Q_{ALL}^*$. This position maximizes $p_{HI}(Q_{ALL})$, which means it is the next position toward the goal while avoiding the humans by considering their blocking intentions. This position is used as the result of the planner and executed on the robot, and the planning is repeated at the next time step with the updated sensor position.

Turning to the produced classification results by a trained classifier, the ability to accurately classify blockers among tracked mobile entities in a robot's space is one desirable and useful aspect of the motion planner proposed and trained by the inventors. In processing the training data, the inventors labeled most of the blocking behaviors in the data set and then used them for training the classifier. However, some situations were left unlabeled so they could be used as control situations to verify the quality of training of a classifier. By using the trained classifier on the recorded data set and comparing it with blocking behaviors, the trained classifier was able to successfully recognize all of the blockers (or humans with an intention to block a robot). Further, all the blocking situations that were intentionally left unlabeled were then classified accurately as blocking behavior with a blocking score provided by the trained classifier of 1.0 or close to this value.

Note, though, that apart from correctly classifying people as blocking the robot (i.e., predicting their intent to block), the classifier prototyped by the inventors sometimes assigns a high probability to people that are just passing by the robot at a close distance, are standing next to the robot, or are located on the robot's planned path but not actively blocking the robot. Even though the intention of these people may not be to block the robot, these humans (or other mobile entities) are acceptably identified as blocking entities because they often will act during the navigation of a robot in a crowded space to unintentionally block the robot's movements (e.g., human-intent predictions should be construed more broadly to include not only intentional blocking activities but also acts that unintentionally hinder a robot's progress (or at least these actions/trajectories would have a higher blocking score (e.g., 0.6 to 0.9 rather than 0 or a low score))).

It may be useful at this point in the description to summarize the motion planning results achieved by the inventors with a motion planner using a trained human-intention classifier. With regard to the experimental setup, the inventors evaluated the motion planner on a recorded data set of a robot navigating through a crowd of people. The real world robot used search and heuristic-based methods, though ultimately this data was used to generate independent blocking events, where a human intentionally blocked the robot in the real-life data collection. The motion planner's ability to circumvent these blockers safely and efficient was tested, before returning to the recorded robot position data until the next blocking event. The starting point for the planner was a point on the actual robot's path ⅙ seconds before the blocking event, and the goal was an actual point on the path 4 seconds after the blocking had ceased. Once the simulated robot planned its way to the goal, the robot was forced to return to its exact location from the recorded data at that time stamp. In this way, later human positions were not invalidated by a cumulative displacement of the robot relative to where it had been during data collection.

Most metrics in robot-crowd motion planners fall into one of two categories: (1) safety; or (2) efficiency. The number of times the operator had to manually call an emergency stop for the robot has been considered as a safety metric, and the time taken to navigate through the crowd was used to measure efficiency. In some situations, the minimum distance is measured between a robot and a pedestrian to measure safety, and the length of the path traveled measured for efficiency evaluations. Running the presently described motion planner on a simulated robot with pre-recorded data, the inventors chose a similar approach to the latter method including measuring the minimum distance to a pedestrian during a blocking event as well as the distance required to be traveled by the robot to reach the goal during that blocking event (with metrics being recorded for 34 blocking events across two sets of recorded data).

One major benefit of the described motion planner is its use of the classification data provided by the offline training to adjust repulsive potential functions away from likely blockers. To test how beneficial this approach is and to compare it to previous work in this area, the inventors ran four motion planning tests across the two sets of recorded data. The first test employed the motion planner where the classification of each agent was decided at run-time as discussed above. Then, the inventors ran the motion planner while setting the classification automatically to three static values, as one would be required to do in previous motion planners. In the second test, the c was set to 0.2, which assumes that every human is unlikely to block the robot. In a third test, c was set to 0.5, the default value, and, finally, in a fourth test, c was set to 0.8, which assumes that every human is more likely to block the robot. The results are shown in Tables I and II below.

TABLE I

Dataset one

|  | Classified | Not Classified | | |
|---|---|---|---|---|
|  |  | c = 0.2 | c = 0.5 | c = 0.8 |
| Length | 100.00% | 110.53% | 128.32% | 163.99% |
| Safety | 0.5017 | 0.5454 | 0.5354 | 0.5192 |

TABLE II

Dataset two

|  | Classified | Not Classified | | |
|---|---|---|---|---|
|  |  | c = 0.2 | c = 0.5 | c = 0.8 |
| Length | 100.00% | 96.460% | 97.530% | 105.52% |
| Safety | 0.6321 | 0.5643 | 0.6222 | 0.6582 |

The recorded data in data set one was of a much denser crowd with more blocking behavior exhibited. Data set two was sparser, with only a few blockers trying to individually block the robot occasionally. The results demonstrate how the motion planner scales with increasing crowd density. In a less dense area, all the tests performed similarly because regardless of the classification they were at least weighted to avoid an individual blocker. In the dense situation, however, the planner took advantage of people who seemed less likely to block and, thus, generated a more efficient path through the crowd. The robot avoided risky situations that may have led to a long delay, but, at the same time, the robot could exploit the knowledge of which pedestrians/humans were unlikely to be blockers by cutting across in front of them based on the high probability that those pedestrians would not get it its way. In this manner, the motion planner described herein achieved the most efficient routes around blockers on average, with only minimal reductions in its safety margin.

Although the invention has been described and illustrated with a certain degree of particularity, the particular implementations described in the present disclosure have been as examples, and numerous changes in the combination and arrangement of parts can be resorted to by those skilled in the art without departing from the spirit and scope of the invention, as claimed.

We claim:

1. A mobile robot, comprising:
a drive system operating to move the mobile robot in a workspace;
a robot controller transmitting control signals to the drive system to follow a trajectory through the workspace;
a motion planner periodically updating the trajectory; and
a human-intention classifier generating a prediction of a future behavior for at least one mobile entity in the workspace,
wherein the motion planner performs the updating of the trajectory using the behavior predictions for the at least one mobile entity, and
wherein the behavior predictions comprise a blocking score for the at least one mobile entity defining a probability that the mobile entity will block travel of the mobile robot by intentionally interacting with the mobile robot.

2. The mobile robot of claim 1, wherein the behavior involves a behavior that blocks future movements of the mobile robot along the trajectory and the behavior that blocks future movement includes intentional interaction with the mobile robot.

3. The mobile robot of claim 1, wherein the updating of the trajectory involves moving toward one or more of the at least one mobile entity with a blocking score corresponding with non-blocking entities.

4. The mobile robot of claim 1, wherein the human-intention classifier is trained to perform the prediction generation in at least one of an offline process completed prior to runtime of the mobile robot, or wherein the prediction generating and the updating of the trajectory are performed during runtime of the mobile robot.

5. The mobile robot of claim 4, wherein the offline process comprises:
gathering, while a robot moves along a goal trajectory through a space shared with a plurality of humans, a set of trajectories for the humans;
identifying a subset of the gathered trajectories for the humans as interfering with movement of the robot along the goal trajectory; and
assigning a blocking score indicating each of the subset of the gathered trajectories is associated with one of the humans that blocks the mobile robot.

6. The mobile robot of claim 5, wherein the prediction generation includes receiving a past trajectory for one of the at least one mobile entity in the workspace and comparing the past trajectory with the subset of the gathered trajectories from the offline process to generate a blocking score for the one of the at least one mobile entity associated with the past trajectory, whereby the past trajectory is used to provide the behavior prediction.

7. The mobile robot of claim 1, wherein the motion planner computes a repulsive potential for each of the at least one mobile entity based on the behavior prediction and generates a predicted trajectory in the workspace for each of the at least one mobile entity using trajectory regression.

8. The mobile robot of claim 7, wherein the motion planner performs the updating of the trajectory based on the repulsive potentials and the predicted trajectories.

9. A method of creating a human-intention classifier for a mobile robot, comprising:
for a predefined time period, with a robot controller, controlling a robot to move along a goal trajectory in a space shared with a plurality of humans;
during the predefined time period, with the robot controller, recording trajectories of the robot and the humans; and
with the robot controller, classifying each of the recorded trajectories for the humans as being associated either with blocking of the robot on the goal trajectory or non-blocking of the travel of the robot on the goal trajectory, wherein the blocking of the robot includes intentional interaction with the robot and wherein the non-blocking of the travel of the robot includes cooperative behavior to avoid collision.

10. The method of claim 9, further including assigning a first blocking score to each of the recorded trajectories associated with the blocking and a second blocking score, differing from the first blocking score, to each of the recorded trajectories associated with the non-blocking of the travel of the robot.

11. The method of claim 10, wherein the recorded trajectories for the humans are associated with the blocking of the robot when the recorded trajectories correspond with a modification of a trajectory of the robot from the goal trajectory.

12. The method of claim 9, further comprising extracting from the recorded trajectories at least one variable from the group consisting of absolute position in the space, velocity, and acceleration, whereby the extracted variable is associated with the recorded trajectory for use in comparing tracked trajectories of a human to provide predictions of future behavior by the human.

13. The method of claim 9, further comprising extracting, relative to the recorded trajectories for the robot, from the recorded trajectories for the humans at least one variable from the group consisting of relative position in the space, relative velocity, and relative acceleration, whereby the extracted variable is associated with the recorded trajectory for use in comparing tracked trajectories of a human to provide predictions of future behavior by the human.

14. A method of navigating a robot through a space shared with one or more mobile humans, comprising:
positioning a mobile robot in a space;
first controlling, with a robot controller, the mobile robot to move along a first trajectory toward a goal location in the space;
determining a past trajectory of a human in the space;
assigning a blocking score to the past trajectory for the human by comparing the past trajectory to a set of prerecorded trajectories each being pre-classified with a probability of blocking behavior, wherein the blocking behavior includes intentional interaction with the mobile robot by the human; and
second controlling, with the robot controller, the mobile robot to move along either the first trajectory or along a second trajectory toward the goal location in the space, wherein the second trajectory is computed based on the blocking score and wherein the second trajectory is computed to avoid the human in the space when the blocking score is greater than a first predefined value and to move toward the human in the space when the blocking score is less than a second predefined value.

15. The method of claim 14, wherein the set of prerecorded trajectories are associated with a first set of trajectories for humans moving within a test space identified as blocking travel of a test robot concurrently moving in the test space and with a second set of trajectories for humans in the test space identified as not blocking travel of the test robot.

16. The method of claim 15, wherein the past trajectory includes at least one of variable in the group consisting of absolute position, velocity, acceleration, position relative to the mobile robot, velocity relative to the mobile robot, and acceleration relative to the mobile robot.

17. The method of claim 16, wherein a value of the at least one variable is compared with a value of a matching variable extracted from the trajectories in the first and second sets.

18. The method of claim 14, wherein the second trajectory is computed based on a repulsive potential value assigned to the human and wherein the repulsive potential value being computed based on the blocking score.

* * * * *